(12) United States Patent
Crandall-Seibert et al.

(10) Patent No.: US 10,372,149 B2
(45) Date of Patent: Aug. 6, 2019

(54) DETENT ALIGNMENT MECHANISM ASSEMBLY

(71) Applicant: Hamilton Sundstrand Corporation, Windsor Locks, CT (US)

(72) Inventors: Cory M. Crandall-Seibert, Roscoe, IL (US); Jeffrey Paul Jacobs, Roscoe, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 276 days.

(21) Appl. No.: 15/209,186

(22) Filed: Jul. 13, 2016

(65) Prior Publication Data

US 2018/0017987 A1    Jan. 18, 2018

(51) Int. Cl.
| | | |
|---|---|---|
| G05G 5/03 | (2008.04) |
| B64C 13/14 | (2006.01) |
| B64C 13/26 | (2006.01) |
| B64C 13/04 | (2006.01) |
| B64C 13/10 | (2006.01) |
| G05G 1/04 | (2006.01) |
| G05G 5/00 | (2006.01) |
| G05G 5/06 | (2006.01) |

(52) U.S. Cl.
CPC ............ *G05G 5/03* (2013.01); *B64C 13/04* (2013.01); *B64C 13/10* (2013.01); *B64C 13/14* (2013.01); *B64C 13/26* (2013.01); *G05G 1/04* (2013.01); *G05G 5/005* (2013.01); *G05G 5/065* (2013.01); *G05G 2505/00* (2013.01)

(58) Field of Classification Search
CPC ............ G05G 5/03; G05G 5/005; G05G 1/04; G05G 5/065; G05G 2505/00; B64C 13/10; B64C 13/14; B64C 13/50; B64C 13/26; B64C 13/04
See application file for complete search history.

(56) References Cited

U.S. PATENT DOCUMENTS

| | | | |
|---|---|---|---|
| 5,038,632 A | | 8/1991 | Watson |
| 5,775,165 A | * | 7/1998 | Lu .............................. 74/473.28 |
| 6,804,586 B2 | * | 10/2004 | Richter et al. .................... 701/3 |

(Continued)

FOREIGN PATENT DOCUMENTS

| | | |
|---|---|---|
| EP | 3000726 A1 | 3/2016 |
| FR | 1336604 A | 8/1963 |

(Continued)

OTHER PUBLICATIONS

Search Report dated Oct. 30, 2017 in European Patent Application No. 17181264.

*Primary Examiner* — Valentina Xavier
(74) *Attorney, Agent, or Firm* — Cantor Colburn LLP

(57) ABSTRACT

A detent alignment mechanism assembly is provided and includes a shaft, a lock mechanism configured to selectively occupy an unlocked position at which the shaft is movable and a locked position at which the shaft is immovable, a detent mechanism coupled to the shaft and formed to define detent positions for the shaft to assume and move between and a detent alignment mechanism configured to provide to an operator of the shaft feedback and assistance corresponding to assumptions of the detent positions by the shaft during movements thereof by the operator.

18 Claims, 4 Drawing Sheets

(56) References Cited

U.S. PATENT DOCUMENTS

| | | |
|---|---|---|
| 6,826,979 B2 | 12/2004 | Dybro |
| 8,375,821 B2 | 2/2013 | Kohorst |
| 8,490,509 B2 | 7/2013 | Giefer et al. |
| 8,499,661 B2 | 8/2013 | Rake et al. |
| 2008/0072698 A1* | 3/2008 | Hirano .............. F16H 9/02 74/473.21 |
| 2010/0071506 A1* | 3/2010 | Kliennannel et al. .. F16H 59/10 74/625 |
| 2010/0307276 A1* | 12/2010 | Giefer et al. .......... F16H 59/04 74/473.3 |
| 2014/0116194 A1 | 5/2014 | Nieman |
| 2014/0157943 A1 | 6/2014 | John |
| 2016/0357215 A1* | 12/2016 | Kull .................. G05G 5/06 |

FOREIGN PATENT DOCUMENTS

| | | | |
|---|---|---|---|
| JP | S6118417 U | 9/1981 | |
| JP | S61120926 U | 7/1986 | |
| JP | S629820 U | 1/1987 | |
| WO | WO-2014084809 A1 * | 6/2014 | ............. B64C 13/10 |

\* cited by examiner

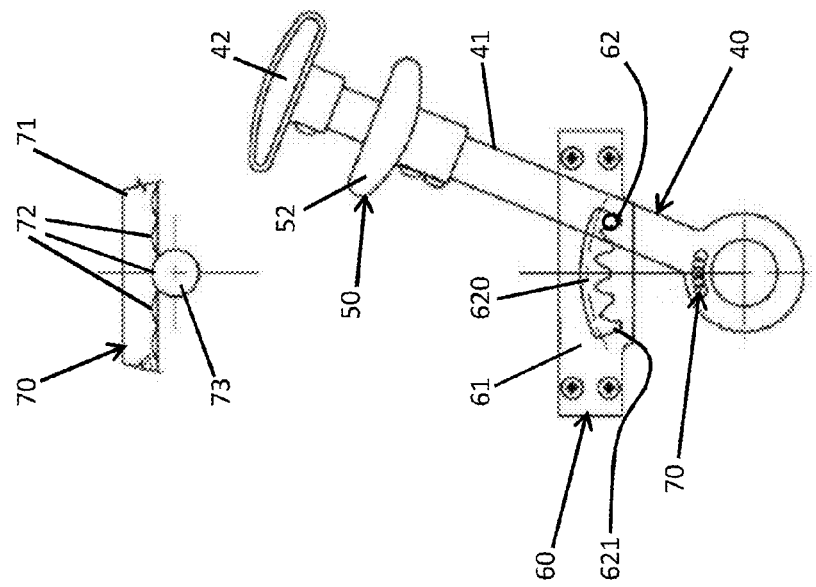
FIG. 4
FIG. 3
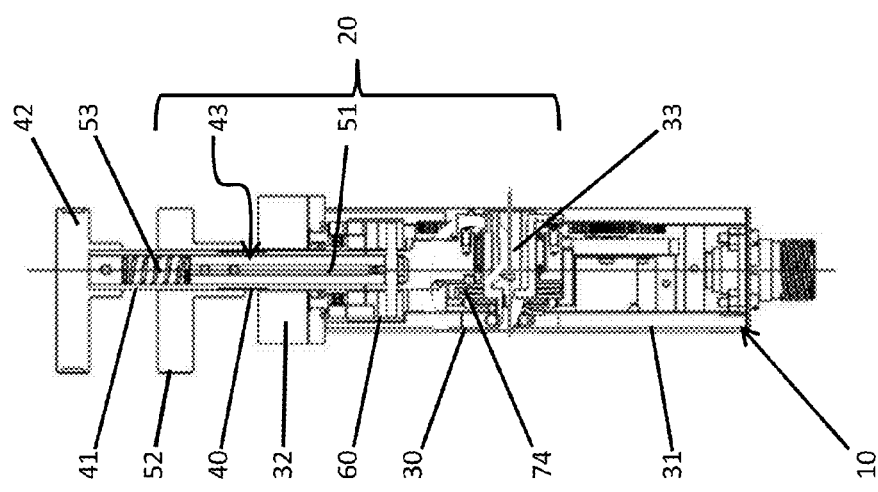
FIG. 2

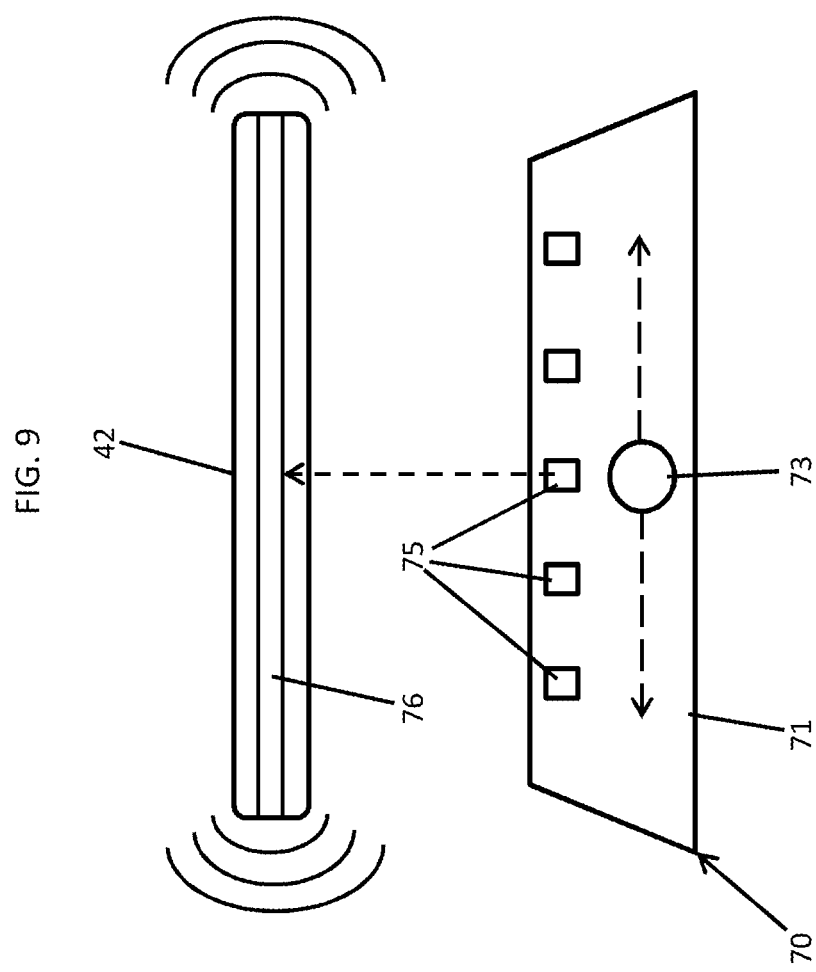

DETENT ALIGNMENT MECHANISM ASSEMBLY

BACKGROUND OF THE DISCLOSURE

The subject matter disclosed herein relates to a detent alignment mechanism assembly and, more particularly, to a detent alignment mechanism assembly for a control stick of a vehicle, such as an aircraft.

Aircraft, such as helicopters or rotary wing aircrafts, are often controlled by a pilot who inputs control commands using various control sticks and levers provided in the aircraft cockpit. The control sticks include, for example, a collective stick and an elevator control stick. The collective stick can be used to collectively increase or decrease rotor blade pitch to thereby increase or decrease thrust generated by the main rotor assembly during flight operations. The elevator control stick can be used to manipulate the orientation of elevator surfaces, such as horizontal stabilizers and ailerons, to provide for increased or decreased control during flight operations.

The control sticks are often movable in forward and reverse directions. In the case of the elevator control stick, the movement is achieved by the pilot grabbing a handle and pulling up on a lift mechanism to effectively unlock the elevator control stick. At this point, the pilot pivots the elevator control stick about a pivot axis to correspondingly cause an elevator surface on the aircraft to move or pivot. Once the pivoting or movement of the elevator surface is completed, the pilot releases the lift mechanism and locks the elevator control stick in place.

A frequent problem with the control sticks is that they are each provided with certain predefined pivot positions or detents. The detents are established by a pin-tooth assembly that associates particular elevator surface positions with particular pin-tooth registration positions. As such, the detents insure that the control sticks can only set certain flight conditions. However, since the detents do not provide any tactile feedback to the pilot when the pilot pulls up on the lift mechanism of an elevator control stick in particular and begins moving or pivoting the elevator control stick about the pivot axis, the pilot has no way of knowing where the elevator control stick is relative to a given one of the detents. This can be confusing or distracting to the pilots and can affect their ability to properly operate their aircraft.

BRIEF DESCRIPTION OF THE DISCLOSURE

According to one aspect of the disclosure, a detent alignment mechanism assembly is provided and includes a shaft, a lock mechanism configured to selectively occupy an unlocked position at which the shaft is movable and a locked position at which the shaft is immovable, a detent mechanism coupled to the shaft and formed to define detent positions for the shaft to assume and move between and a detent alignment mechanism configured to provide to an operator of the shaft feedback and assistance corresponding to assumptions of the detent positions by the shaft during movements thereof by the operator.

In accordance with additional or alternative embodiments, the lock mechanism includes a spring-loaded lift mechanism disposed on the shaft.

In accordance with additional or alternative embodiments, the detent mechanism includes a toothed plate and a pin that is movable relative to the toothed plate by the lock mechanism.

In accordance with additional or alternative embodiments, the detent alignment mechanism includes a plate formed to define pockets and a detent element biased toward the plate.

In accordance with additional or alternative embodiments, the pockets are aligned with the detent positions.

In accordance with additional or alternative embodiments, the detent element is spring-loaded.

In accordance with additional or alternative embodiments, the detent element and the pockets are rounded and have a same radius of curvature or varying radii of curvatures.

In accordance with additional or alternative embodiments, the detent element and the pockets are angular and have similar or varying edge lengths.

In accordance with additional or alternative embodiments, the detent alignment mechanism includes a plate formed to define detent alignment positions and a detent element biased toward the plate.

According to another aspect of the disclosure, a detent alignment mechanism assembly is provided for use in an aircraft. The detent alignment mechanism assembly includes a housing affixed to an airframe of the aircraft, a shaft coupled to controllable surfaces of the aircraft, a lock mechanism configured to selectively occupy an unlocked position at which the shaft is movable relative to the housing and a locked position at which the shaft is immovable relative to the housing, a detent mechanism coupled to the housing and the shaft and formed to define detent positions for the shaft to assume and move between and a detent alignment mechanism configured to provide to an operator of the shaft feedback and assistance corresponding to assumptions of the detent positions by the shaft during movements thereof by the operator.

In accordance with additional or alternative embodiments, the lock mechanism includes a spring-loaded lift mechanism disposed on the shaft.

In accordance with additional or alternative embodiments, the detent mechanism includes a toothed plate disposed in the housing and a pin that is movable relative to the toothed plate by the lock mechanism.

In accordance with additional or alternative embodiments, the detent alignment mechanism includes a plate formed to define pockets and a detent element biased toward the plate.

In accordance with additional or alternative embodiments, the pockets are aligned with the detent positions.

In accordance with additional or alternative embodiments, the detent element is spring-loaded.

In accordance with additional or alternative embodiments, the detent element and the pockets are rounded and have a same radius of curvature or varying radii of curvatures.

In accordance with additional or alternative embodiments, the detent element and the pockets are angular and have similar or varying edge lengths.

In accordance with additional or alternative embodiments, the detent alignment mechanism includes a plate formed to define detent alignment positions and a detent element biased toward the plate.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 2 is a cutaway elevation view of a control stick of the aircraft of FIG. 1;

FIG. 3 is a schematic side view of the control stick of FIG. 2;

FIG. 4 is an enlarged view of components of a detent alignment mechanism of the control stick of FIGS. 2 and 3 in accordance with embodiments;

FIG. 9 is an enlarged view of sensor components of a detent alignment mechanism of the control stick of FIGS. 2 and 3 in accordance with alternative embodiments and an operator feedback element coupled to the sensor components in accordance with embodiments.

The detailed description explains embodiments of the disclosure, together with advantages and features, by way of example with reference to the drawings.

DETAILED DESCRIPTION OF THE DISCLOSURE

As will be described below, a detent mechanism for use with a vehicle such as an aircraft includes a detent alignment mechanism. The detent alignment mechanism may be a ball ramp alignment mechanism or another similar feature and is configured to provide a pilot with feedback along with an alignment force that aligns the detent mechanism into a predefined detent position. The detent alignment mechanism may, in some cases, provide the pilot with haptic feedback of increasing and decreasing force as the pilot moves a control stick between detent alignment mechanism pockets that inform the pilot as to the relative position of the control stick and proper positions for the control stick.

Figure 1:
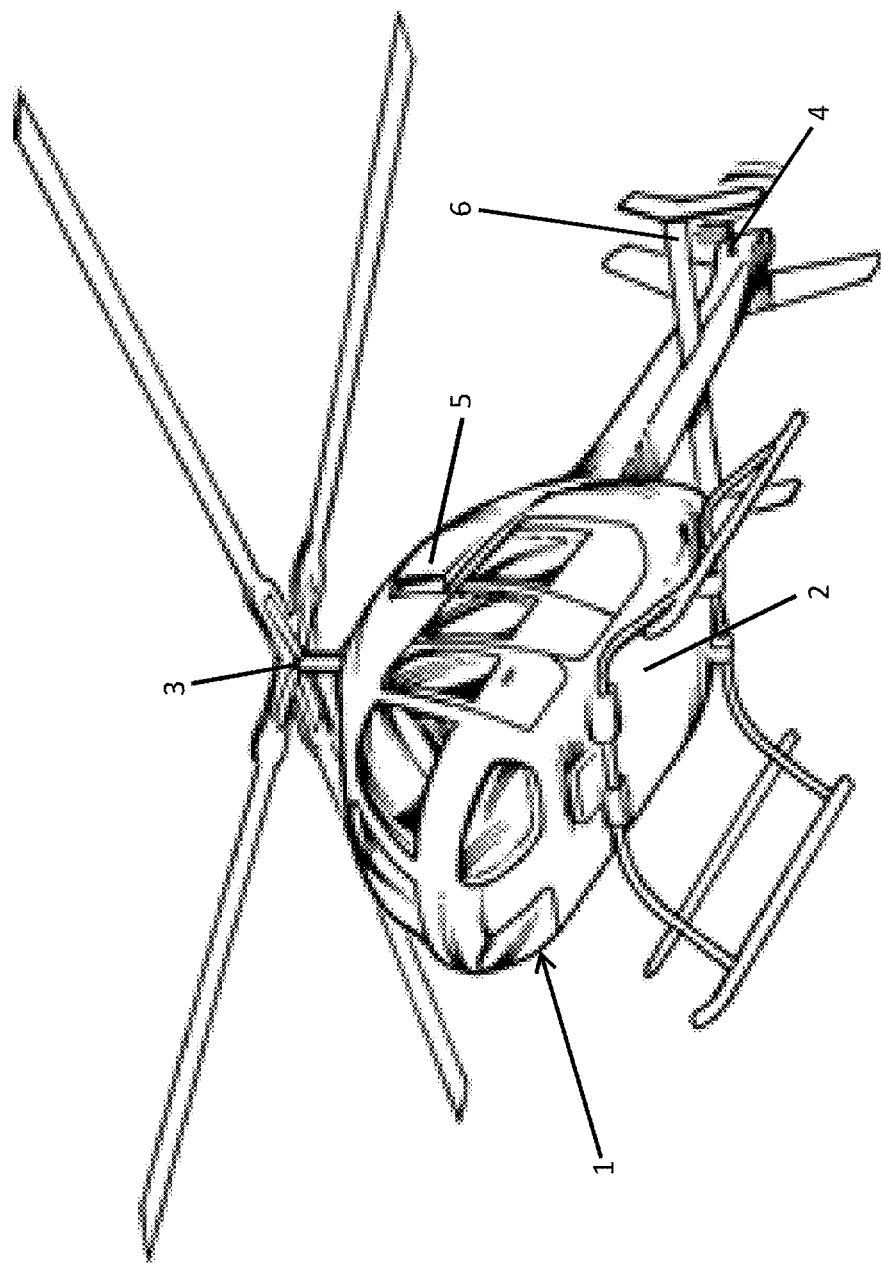
FIG. 1 is a perspective illustration of an aircraft in accordance with embodiments.

With reference to FIGS. 1 and 2, a vehicle such as an aircraft 1 is provided and may be configured as a helicopter or a rotary wing aircraft for example. The aircraft 1 may include an airframe 2 that is formed to define a cockpit and a cabin in which crew and possibly passengers are accommodated, a main rotor assembly 3, a tail rotor assembly 4 and a power generation system 5. The main rotor assembly 3 is generally located at an upper portion of the airframe 2 and is drivable to rotate about a rotational axis to generate thrust and lift for the aircraft 1. The tail rotor assembly 4 is generally located at a tail of the aircraft 1 and is rotatable about a rotational axis to generate torque by which an attitude of the aircraft 1 is controllable. The power generation system 5 is housed within the airframe and generates power that is transmitted to the main and tail rotor assemblies 3 and 4 by which the main and tail rotor assemblies 3 and 4 are operable.

The aircraft 1 may further include controllable surfaces 6, control elements, such as a control stick 10, within the cockpit and a flight computer. The controllable surfaces 6 may be provided as an elevator surface at the tail of the aircraft 1 and are movable or pivotable in order to provide for certain flight controls during flight operations. The movement or pivoting of the controllable surfaces 6 is controlled by among other things the control stick 10 as will be described below. The flight computer may be configured to control multiple features of the aircraft 1 in accordance with pilot inputted commands and current flight conditions.

With reference to FIGS. 2-4, the controllable surfaces 6 may occupy and move between certain predefined positions and the control stick 10 is operable by the pilot of the aircraft 1 to cause the controllable surfaces 6 to move or pivot relative to detent positions respectively associated with the predefined positions of the controllable surfaces 6. In addition, a detent alignment mechanism assembly 20 is provided to aid in the alignment of the control stick 10 with those detent positions. The detent alignment mechanism assembly 20 includes a housing 30, a shaft 40, a lock mechanism 50, a detent mechanism 60 and a detent alignment mechanism 70.

The housing 30 includes a lower housing 31 that is affixed to the airframe 2, an upper housing 32 that extends upwardly from an uppermost portion of the lower housing 31 and a post element 33. The upper housing 32 is formed to define an open interior space in which the post element 33 is disposable to define a pivot axis in parallel with a longitudinal axis of the post element 33.

The shaft 40 is coupled to the controllable surfaces 6 directly or by way of the flight computer and includes a shaft portion 41 and a handle portion 42. The shaft portion 41 may be coupled to the post element 33 and extends upwardly from the post element 33 through the open interior space defined in the upper housing 32. The shaft portion 41 is movable or pivotable (hereinafter the movement of the shaft 40 and shaft portion 41 will be referred to as a pivoting for purposes of clarity and brevity) about the pivot axis and thus the open interior space may be elongate in the direction of the pivoting of the shaft portion 41. The shaft portion 41 may be partially hollow to define a shaft interior 43. The handle portion 42 is disposed at a distal end of the shaft portion 41 and is grippable by an operator or pilot.

The lock mechanism 50 is configured to selectively occupy an unlocked position and a locked position. When the lock mechanism 50 occupies the unlocked position, the detent mechanism is disengaged and permits the shaft 40 to pivot about the pivot axis. On the other hand, when the lock mechanism 50 occupies the locked position, the shaft 40 is prevented from pivoting by the detent mechanism 60. The lock mechanism 50 may be provided as a spring-loaded lift mechanism disposed on the shaft 40 and thus includes a body 51, which is at least partially disposable within the shaft interior 43, a lift handle 52 that is connected with the body 51 and a biasing element 53. The biasing element 53 may be a spring or another deformable feature and may be disposed within the shaft interior 43. In any case, the biasing element 53 biases the body 51 away from the handle portion 42. The lift handle 52 is disposed proximate to the handle portion 42 and may be gripped by the operator or pilot such that the lift handle 52 and the body 51 are drawn together toward the handle portion 42 in opposition to the bias provided by the biasing element 53.

The detent mechanism 60 is coupled to the upper housing 32 and the shaft portion 41 and is formed to define detent positions for the shaft to assume and move between. The detent positions are respectively associated with the predefined positions of the controllable surfaces 6. The detent mechanism 60 includes a toothed plate 61 and a pin 62. The toothed plate 61 is secured to the upper housing 32 and is formed to define an arced groove 620 with teeth formations 621 arranged along a bottom of the arced groove 620. The pin 62 is carried by the shaft 40 and is coupled to the lock mechanism 50 to be movable relative to the toothed plate 61.

That is, as shown in FIG. 3, the pin 62 may initially sit within a neutral or offset tooth formation 621. In this position, the pin 62 is urged toward the bottom of the tooth formation 621 by the biasing element 53 by way of the coupling between the pin 62 and the body 51 of the lock mechanism 50 such that mechanical interference between the pin 62 and the walls of the tooth formation 621 prevents movements of the pin 62 and thus a pivoting of the shaft 40. In an event that the operator or pilot wishes to manipulate the controllable surfaces 6, the operator or pilot lifts the lift handle 52 toward the handle portion 42 and in opposition to the bias provided by the biasing element 53 and thereby draws the pin 62 upwardly and out of the tooth formation 621. At this point, the pin 62 is free to move through the arced groove 620 with the pivoting of the shaft 40 until the operator or pilot releases the lift handle 52. Assuming that the pin 62 is aligned with any of the teeth formations 621 at the moment of the lift handle 52 being released, the pin 62 will be biased toward the bottom of that one of the teeth formation 621 whereupon the movements of the pin 62 and corresponding pivoting of the shaft 40 are again prevented.

The detent alignment mechanism 70 is configured to provide to the operator or pilot feedback and assistance corresponding to assumptions of the detent positions by the shaft 40 during movements of the shaft 40 by the operator or pilot. That is, when the pin 62 is drawn upwardly and out of the teeth formations 621 and thus enters the arced groove 620, no forces are applied to the pin 62 that would alert the operator or pilot as to the position of the pin 62 relative to the teeth formations 621. The detent alignment mechanism 70 thus serves to alert the operator or pilot as to the position of the pin 62 relative to the teeth formations 621 and to assist with positioning the shaft 40 such that the pin 62 is aligned with a selected one of the teeth formations 621.

In accordance with embodiments and, as shown in FIGS. 2 and 4, the detent alignment mechanism 70 may include a plate 71 that is formed to define pockets 72 and a detent element 73 that is biased toward the plate 71 by a biasing element 74 that spring-loads the detent element 73. The plate 71 is secured to the upper housing 32 below the toothed plate 61 and the pockets 72 are aligned with the detent positions of the pins 62 and the teeth formations 621. The detent element 73 and the biasing element 74 are coupled to the shaft 40. Thus, as the shaft 40 pivots from a position associated with the pin 62 being seated within the teeth formations 621, the detent element 73 correspondingly moves from the corresponding one of the pockets 72 to one of the other pockets 72.

The detent element 73 and the pockets 72 may be rounded and have a same radius of curvature. That is, the detent element 73 may be provided as a ball that fits tightly within the each of the pockets 72. As such, due to the bias applied to the detent element 73 by the biasing element 74, the operator or pilot handling the shaft 40 will experience increasingly resistive haptic feedback to the pivoting of the shaft 40 as the detent element 73 is withdrawn from one of the pockets 72, decreasingly resistive haptic feedback as the detent element 73 approaches one of the pockets 72 and a release of haptic feedback when the detent element 73 sits within one of the pockets 72. This release indicates to the operator or pilot that the shaft 40 is properly positioned with the pin 62 aligned with one of the teeth formations 621.

Figure 5:
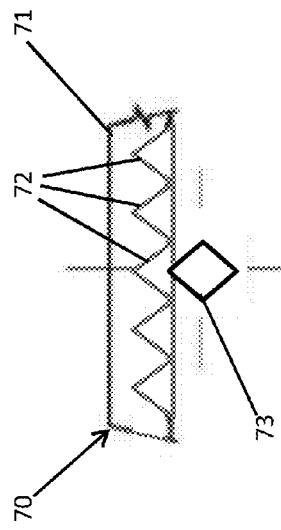
FIG. 5 is an enlarged view of components of a detent alignment mechanism of the control stick of FIGS. 2 and 3 in accordance with alternative embodiments.

In accordance with alternative embodiments and, with reference to FIG. 5, the detent element 73 and the pockets 72 may be rounded with varying radii of curvatures. For example, the detent element 73 may be provided as a ball with a substantially smaller radius of curvature that that of the pockets 72. In this case, the haptic feedback provided to the operator or pilot will be reduced as compared to the embodiments of FIG. 4 so that movement of the shaft 40 will be smoothed out.

Figure 6:
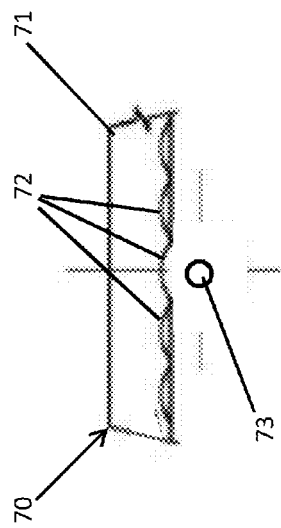
FIG. 6 is an enlarged view of components of a detent alignment mechanism of the control stick of FIGS. 2 and 3 in accordance with alternative embodiments.
Figure 7:
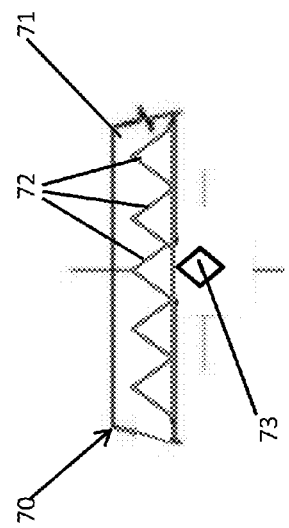
FIG. 7 is an enlarged view of components of a detent alignment mechanism of the control stick of FIGS. 2 and 3 in accordance with alternative embodiments.

In accordance with alternative embodiments and, with reference to FIGS. 6 and 7, the detent element 73 and the pockets 72 may be angular with similar edge lengths. For example, as shown in FIG. 6, the pockets 72 may be provided with right angled edges and the detent element 73 may be provided as a polygonal or squared element with same edge lengths as the pockets 72. In this case, the haptic feedback provided to the operator or pilot will be increased as compared to the embodiments of FIGS. 4 and 5 so that movement of the shaft 40 will be discrete. Alternatively, as shown in FIG. 7, the pockets 72 may be provided with right angled edges and the detent element 73 may be provided as a polygonal or squared element with shorter edge lengths than the pockets 72.

Figure 8:
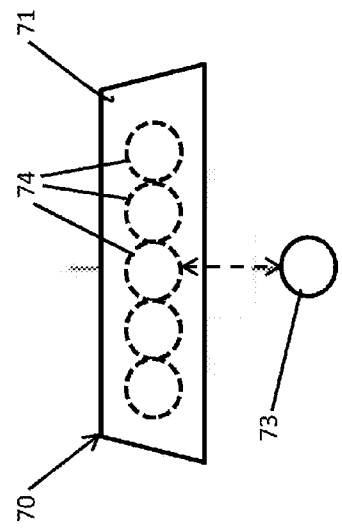
FIG. 8 is an enlarged view of magnetic components of a detent alignment mechanism of the control stick of FIGS. 2 and 3 in accordance with alternative embodiments.

In accordance with additional alternative embodiments and, with reference to FIG. 8, the detent element 73 and the plate 71 may be electromagnetically attracted toward one another. In this case, the plate 71 may be formed to define a series of magnetic "pockets" 74 and the detent element 73 may be formed with ferromagnetic or electromagnetic materials. Thus, as the detent element 73 travels along the plate 71, the detent element 73 is sequentially attracted to the magnetic "pockets" 74 and is thus biased toward the plate 71 to thereby provide haptic feedback to the operator or pilot.

In accordance with additional alternative embodiments and, with reference to FIG. 9, the plate 71 may be provided with a sensor 75 (e.g., an optical sensor or any other type of position sensing device) and the handle portion 42 may be provided with a vibration actuation element 76 which is operably coupled with the sensor 75. In this case, as the detent element 73 travels along the plate 71, the sensor 75 senses the position of the detent element 73 and issues a signal to the vibration actuation element 76 to either activate or deactivate. Thus, the operator or pilot can be alerted to the position of the detent element 73 by the feel of the handle portion 42 when the vibration actuation element 76 is activated.

Although various embodiments have been described herein, it is to be understood that each embodiment can be used in concert with the others and that several can be reversed in their respective configuration. For example, the detent mechanism 60 can be provided with the toothed plate 61 disposed on the shaft 40 and the pin 62 secured to the upper housing 32. Similarly, the detent alignment mechanism 70 can be provided with the plate 71 disposed on the shaft 40 and the detent element 73 secured to the upper housing 32.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A detent alignment mechanism assembly, comprising:
a shaft, which is configured to be pivoted about a pivot axis by an operator, and which comprises a handle at a distal end opposite the pivot axis;
a lock mechanism configured to be lifted by the operator gripping the handle along the shaft toward the handle to selectively occupy an unlocked position, which is characterized in that the shaft is pivotable about the pivot axis, and to be released by the operator to move away from the handle toward a locked position, which is characterized in that the shaft is not pivotable about the pivot axis;
a detent mechanism coupled to a first portion of the shaft and formed to define detent positions for the shaft to assume with the lock mechanism selectively occupying the locked position such that the detent mechanism is engaged and for the shaft to move between with the lock mechanism selectively occupying the unlocked position such that the detent mechanism is disengaged; and
a detent alignment mechanism coupled to a second portion of the shaft, which is radially interposed between the first portion of the shaft and the pivot axis, the detent alignment mechanism being configured to provide to the operator feedback and assistance corresponding to assumptions of the detent positions by the shaft during pivots thereof about the pivot axis by the operator.

2. The detent alignment mechanism assembly according to claim 1, wherein the lock mechanism comprises a spring-loaded lift mechanism disposed on the shaft.

3. The detent alignment mechanism assembly according to claim 1, wherein the detent mechanism comprises a toothed plate and a pin that is movable relative to the toothed plate by the lock mechanism.

4. The detent alignment mechanism assembly according to claim 1, wherein the detent alignment mechanism comprises a plate formed to define pockets and a detent element biased toward the plate.

5. The detent alignment mechanism assembly according to claim 4, wherein the pockets are aligned with the detent positions.

6. The detent alignment mechanism assembly according to claim 4, wherein the detent element is spring-loaded.

7. The detent alignment mechanism assembly according to claim 4, wherein the detent element and the pockets are rounded and have a same radius of curvature or varying radii of curvatures.

8. The detent alignment mechanism assembly according to claim 4, wherein the detent element and the pockets are angular and have similar or varying edge lengths.

9. The detent alignment mechanism assembly according to claim 1, wherein the detent alignment mechanism comprises a plate formed to define detent alignment positions and a detent element biased toward the plate.

10. A detent alignment mechanism assembly for use in an aircraft, comprising:
a housing affixed to an airframe of the aircraft;
a shaft coupled to controllable surfaces of the aircraft, the shaft being configured to be pivoted about a pivot axis by an operator and comprising a handle at a distal end opposite the pivot axis;
a lock mechanism configured to be lifted by the operator gripping the handle along the shaft toward the handle to selectively occupy an unlocked position, which is characterized in that the shaft is pivotable about the pivot axis relative to the housing, and to be released by the operator to move away from the handle toward a locked position, which is characterized in that the shaft is not pivotable about the pivot axis relative to the housing;
a detent mechanism coupled to the housing and a first portion of the shaft and formed to define detent positions for the shaft to assume with the lock mechanism selectively occupying the locked position such that the detent mechanism is engaged and for the shaft to move between with the lock mechanism selectively occupying the unlocked position such that the detent mechanism is disengaged; and
a detent alignment mechanism coupled to a second portion of the shaft, which is radially interposed between the first portion of the shaft and the pivot axis, the detent alignment mechanism being configured to provide to the operator feedback and assistance corresponding to assumptions of the detent positions by the shaft during pivots thereof about the pivot axis by the operator.

11. The detent alignment mechanism assembly according to claim 10, wherein the lock mechanism comprises a spring-loaded lift mechanism disposed on the shaft.

12. The detent alignment mechanism assembly according to claim 10, wherein the detent mechanism comprises a toothed plate disposed in the housing and a pin that is movable relative to the toothed plate by the lock mechanism.

13. The detent alignment mechanism assembly according to claim 10, wherein the detent alignment mechanism comprises a plate formed to define pockets and a detent element biased toward the plate.

14. The detent alignment mechanism assembly according to claim 13, wherein the pockets are aligned with the detent positions.

15. The detent alignment mechanism assembly according to claim 13, wherein the detent element is spring-loaded.

16. The detent alignment mechanism assembly according to claim 13, wherein the detent element and the pockets are rounded and have a same radius of curvature or varying radii of curvatures.

17. The detent alignment mechanism assembly according to claim 13, wherein the detent element and the pockets are angular and have similar or varying edge lengths.

18. The detent alignment mechanism assembly according to claim 10, wherein the detent alignment mechanism comprises a plate formed to define detent alignment positions and a detent element biased toward the plate.

* * * * *